United States Patent
Rahman et al.

(10) Patent No.: US 11,312,373 B2
(45) Date of Patent: Apr. 26, 2022

(54) VEHICLE DETECTION AND RESPONSE

(71) Applicant: Ford Global Technologies, LLC, Dearborn, MI (US)

(72) Inventors: Yousaf Rahman, Ypsilanti, MI (US); Mrdjan J. Jankovic, Birmingham, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

(21) Appl. No.: 16/809,664

(22) Filed: Mar. 5, 2020

(65) Prior Publication Data
US 2021/0276546 A1 Sep. 9, 2021

(51) Int. Cl.
| | |
|---|---|
| *B60W 30/00* | (2006.01) |
| *B60W 30/09* | (2012.01) |
| *B60W 60/00* | (2020.01) |
| *B60W 40/04* | (2006.01) |
| *B60W 30/16* | (2020.01) |

(52) U.S. Cl.
CPC .......... *B60W 30/09* (2013.01); *B60W 30/162* (2013.01); *B60W 40/04* (2013.01); *B60W 60/0016* (2020.02)

(58) Field of Classification Search
CPC ............. B60W 30/09; B60W 60/0016; B60W 30/162; B60W 40/04
See application file for complete search history.

(56) References Cited

U.S. PATENT DOCUMENTS

| | | | |
|---|---|---|---|
| 9,517,767 B1 * | 12/2016 | Kentley | B60W 30/08 |
| | | | 701/23 |
| 10,486,707 B2 | 11/2019 | Zelman et al. | |
| 2014/0070980 A1 * | 3/2014 | Park | G01S 13/931 |
| | | | 342/118 |

(Continued)

FOREIGN PATENT DOCUMENTS

| | | |
|---|---|---|
| CN | 110288835 A | 9/2019 |
| WO | 2019232355 A1 | 12/2019 |

OTHER PUBLICATIONS

Chen, Y. et al., "Obstacle Avoidance for Low-Speed Autonomous Vehicles With Barrier Function," IEEE Transactions on Control Systems Technology, Feb. 2017, 14 pages.

*Primary Examiner* — Thomas G Black
*Assistant Examiner* — Brittany Renee Peko
(74) *Attorney, Agent, or Firm* — Frank A. MacKenzie; Bejin Bieneman PLC (57) ABSTRACT

A computer is programmed to identify a target vehicle to be monitored and to identify first and second virtual boundaries on a roadway based on a position of the target vehicle. The computer is further programmed to determine a first constraint value based on (1) a first boundary approach velocity and (2) a first boundary approach acceleration and a second constraint value based on (1) a second boundary approach velocity and (2) a second boundary approach acceleration. The computer is further programmed to identify a maneuver of the target vehicle based on whether the first and second constraint values violate respective thresholds or a position of the target vehicle relative to the first and second virtual boundaries violates a threshold and to adjust a path of a host vehicle according to the identified maneuver.

20 Claims, 7 Drawing Sheets

(56) References Cited

U.S. PATENT DOCUMENTS

| | | | |
|---|---|---|---|
| 2015/0032362 A1* | 1/2015 | Goudy | G08G 1/166 |
| | | | 701/301 |
| 2017/0120906 A1* | 5/2017 | Penilla | B60W 30/09 |
| 2018/0086263 A1* | 3/2018 | Moradi-Peri | B60Q 9/008 |
| 2018/0290686 A1* | 10/2018 | Minoiu Enache | B62D 15/0265 |
| 2020/0218906 A1* | 6/2020 | Wang | G06K 9/00798 |

* cited by examiner

VEHICLE DETECTION AND RESPONSE

BACKGROUND

A vehicle can use sensors to detect a target object on a roadway. Vehicle sensors can detect a target position and speed relative to the vehicle. For example, the sensors can detect the position of the target relative to the vehicle. The vehicle can respond to detecting the target, e.g., by steering away from the target, by braking prior to reaching the target, etc.

DETAILED DESCRIPTION

A system includes a computer including a processor and a memory, the memory storing instructions executable by the processor to identify a target vehicle to be monitored, identify first and second virtual boundaries on a roadway based on a position of the target vehicle, determine a first constraint value based on (1) a first boundary approach velocity of the target vehicle including a heading angle of the target vehicle and (2) a first boundary approach acceleration of the target vehicle including a steering angle of the target vehicle, determine a second constraint value based on (1) a second boundary approach velocity of the target vehicle including the heading angle of the target vehicle and (2) a second boundary approach acceleration of the target vehicle including the steering angle of the target vehicle, identify a maneuver of the target vehicle based on whether the first constraint value violates a first threshold, the second constraint value violates a second threshold, or a position of the target vehicle relative to the first and second virtual boundaries violates a third threshold, and adjust a path of a host vehicle to avoid the target vehicle according to the identified maneuver.

The instructions can further include instructions to identify the maneuver as a left turn when the first constraint value does not violate the first threshold, the second constraint value violates the second threshold, and the position of the target vehicle relative to the first virtual boundary does not violate the third threshold.

The instructions can further include instructions to identify the maneuver as a right turn when the first constraint value violates the first threshold, the second constraint value does not violate the second threshold, and the position of the target vehicle relative to the second virtual boundary does not violate the third threshold.

The instructions can further include instructions to input the identified maneuver into a path planning algorithm to generate an adjusted path to avoid the target vehicle.

The instructions can further include instructions to actuate one or more of a propulsion, a steering, or a brake of the host vehicle to follow the adjusted path to avoid the target vehicle.

The instructions can further include instructions to determine that the first value violates the first threshold based on a sign of the first value.

The instructions can further include instructions to determine that the position of the target vehicle violates the third threshold when the target vehicle crosses one of the first virtual boundary or the second virtual boundary.

The instructions can further include instructions to input a plurality of reference trajectories into respective equations defining the first and second virtual boundaries and the first and second constraint values, the equations including a plurality of reference coefficients, to minimize a cost function to generate a plurality of coefficients for the equations.

The instructions can further include instructions to predict an initiation time for a specified maneuver of one of the reference trajectories and to determine a time difference between the predicted initiation time and a specified initiation time for the specified maneuver.

The instructions can further include instructions to adjust the plurality of coefficients to minimize respective time differences for each of the plurality of reference trajectories.

The instructions can further include instructions to, upon minimizing a sum of the time differences, identify the plurality of coefficients associated with the minimized sum and assign the plurality of coefficients to replace the reference coefficients of the equations.

The plurality of coefficients can include a coefficient for the first boundary approach velocity and a second coefficient for the second boundary approach velocity.

A method includes identifying a target vehicle to be monitored, identifying first and second virtual boundaries on a roadway based on a position of the target vehicle, determining a first constraint value based on (1) a first boundary approach velocity of the target vehicle including a heading angle of the target vehicle and (2) a first boundary approach acceleration of the target vehicle including a steering angle of the target vehicle, determining a second constraint value based on (1) a second boundary approach velocity of the target vehicle including the heading angle of the target vehicle and (2) a second boundary approach acceleration of the target vehicle including the steering angle of the target vehicle, identifying a maneuver of the target vehicle based on whether the first constraint value violates a first threshold, the second constraint value violates a second threshold, or a position of the target vehicle relative to the first and second virtual boundaries violates a third threshold, and adjusting a path of a host vehicle to avoid the target vehicle according to the identified maneuver.

The method can further include identifying the maneuver as a left turn when the first constraint value does not violate the first threshold, the second constraint value violates the second threshold, and the position of the target vehicle relative to the first virtual boundary does not violate the third threshold.

The method can further include identifying the maneuver as a right turn when the first constraint value violates the first threshold, the second constraint value does not violate the second threshold, and the position of the target vehicle relative to the second virtual boundary does not violate the third threshold.

The method can further include inputting the identified maneuver into a path planning algorithm to generate an adjusted path to avoid the target vehicle.

The method can further include actuating one or more of a propulsion, a steering, or a brake of the host vehicle to follow the adjusted path to avoid the target vehicle.

The method can further include determining that the first value violates the first threshold based on a sign of the first value.

The method can further include determining that the position of the target vehicle violates the third threshold when the target vehicle crosses one of the first virtual boundary or the second virtual boundary.

The method can further include inputting a plurality of reference trajectories into respective equations defining the first and second virtual boundaries and the first and second constraint values, the equations including a plurality of reference coefficients, to minimize a cost function to generate a plurality of coefficients for the equations.

The method can further include predicting an initiation time for a specified maneuver of one of the reference trajectories and determining a time difference between the predicted initiation time and a specified initiation time for the specified maneuver.

The method can further include adjusting the plurality of coefficients to minimize respective time differences for each of the plurality of reference trajectories.

The method can further include, upon minimizing a sum of the time differences, identifying the plurality of coefficients associated with the minimized sum and assigning the plurality of coefficients to replace the reference coefficients of the equations.

A system includes a host vehicle including a propulsion, a brake, and a steering, a target vehicle, means for identifying first and second virtual boundaries on a roadway based on a position of the target vehicle, means for determining a first constraint value based on (1) a first boundary approach velocity of the target vehicle including a heading angle of the target vehicle and (2) a first boundary approach acceleration of the target vehicle including a steering angle of the target vehicle, means for determining a second constraint value based on (1) a second boundary approach velocity of the target vehicle including the heading angle of the target vehicle and (2) a second boundary approach acceleration of the target vehicle including the steering angle of the target vehicle, means for identifying a maneuver of the target vehicle based on whether the first constraint value violates a first threshold, the second constraint value violates a second threshold, or a position of the target vehicle relative to the first and second virtual boundaries violates a third threshold, and means for actuating at least one of the propulsion, the brake, or the steering of the host vehicle to avoid the target vehicle according to the identified maneuver.

The system can further include comprising means for identifying the maneuver as a left turn when the first constraint value does not violate the first threshold, the second constraint value violates the second threshold, and the position of the target vehicle relative to the first virtual boundary does not violate the third threshold.

The system can further include means for identifying the maneuver as a right turn when the first constraint value violates the first threshold, the second constraint value does not violate the second threshold, and the position of the target vehicle relative to the second virtual boundary does not violate the third threshold.

The system can further include means for inputting the identified maneuver into a path planning algorithm to generate an adjusted path to avoid the target vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Predicting a maneuver of a target vehicle with virtual boundaries allows a host vehicle to predict an intent of the target vehicle prior to performing the maneuver. The host vehicle can identify one or more constraint values representing motion of the target vehicle. The constraint values are based on velocity and acceleration at which the target vehicle approaches the virtual boundaries and with other factors as discussed below, e.g., target vehicle heading angle and steering angle. When one or more of the constraint values violate respective thresholds, the host vehicle can predict a maneuver performed by the target vehicle. The host vehicle can input the maneuver to a path planning algorithm to adjust a path to avoid the target vehicle. The virtual boundaries, boundary approach velocity, and boundary approach acceleration allow the host vehicle to predict the target vehicle maneuver with less data and fewer computations than, e.g., a machine learning program. Using the boundary approach velocity and the boundary approach acceleration can allow the host vehicle to predict the maneuver prior the target vehicle crossing one of the virtual boundaries and to adjust the path prior to the host vehicle reaching the virtual boundaries.

Figure 1:
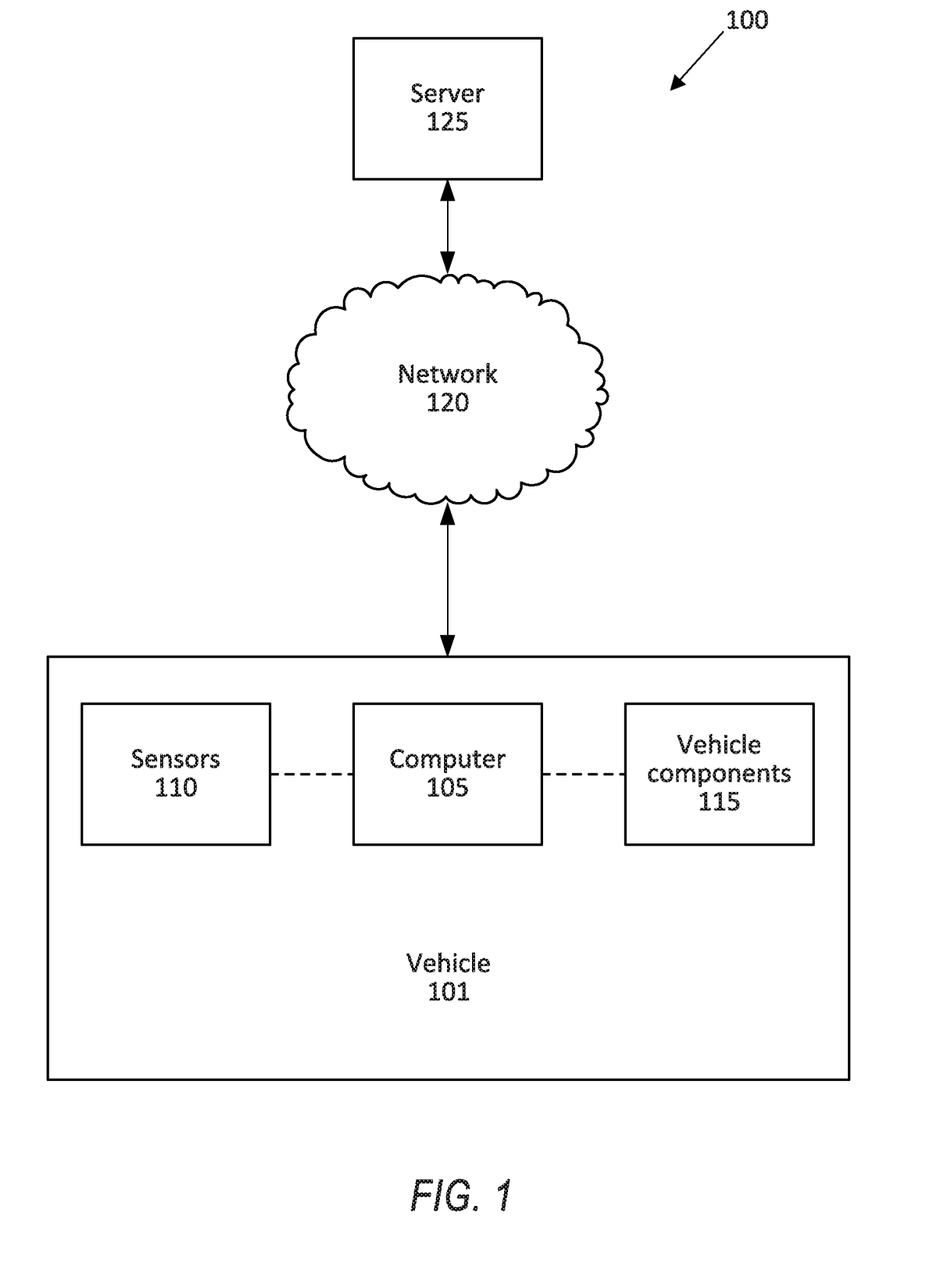
FIG. 1 is a block diagram of an example system for detecting a target.

FIG. 1 illustrates an example system 100 for detecting a target to be monitored. A computer 105 in a host vehicle 101 is programmed to receive collected data from one or more sensors 110. For example, host vehicle 101 data may include a location of the host vehicle 101, data about an environment around a vehicle, data about an object outside the host vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a host vehicle 101 velocity, a host vehicle 101 trajectory, etc.

The computer 105 is generally programmed for communications on a host vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the host vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the host vehicle network may be used for communications between devices represented as the computer 105 in this disclosure. In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the host vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a host vehicle 101 may operate as sensors 110 to provide data via the host vehicle 101 network or bus, e.g., data relating to vehicle speed, acceleration, position, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a host vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The host vehicle 101 can include a plurality of vehicle components 115. In this context, each vehicle component 115 includes one or more hardware components adapted to perform a mechanical function or operation—such as moving the host vehicle 101, slowing or stopping the host vehicle 101, steering the host vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the host vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
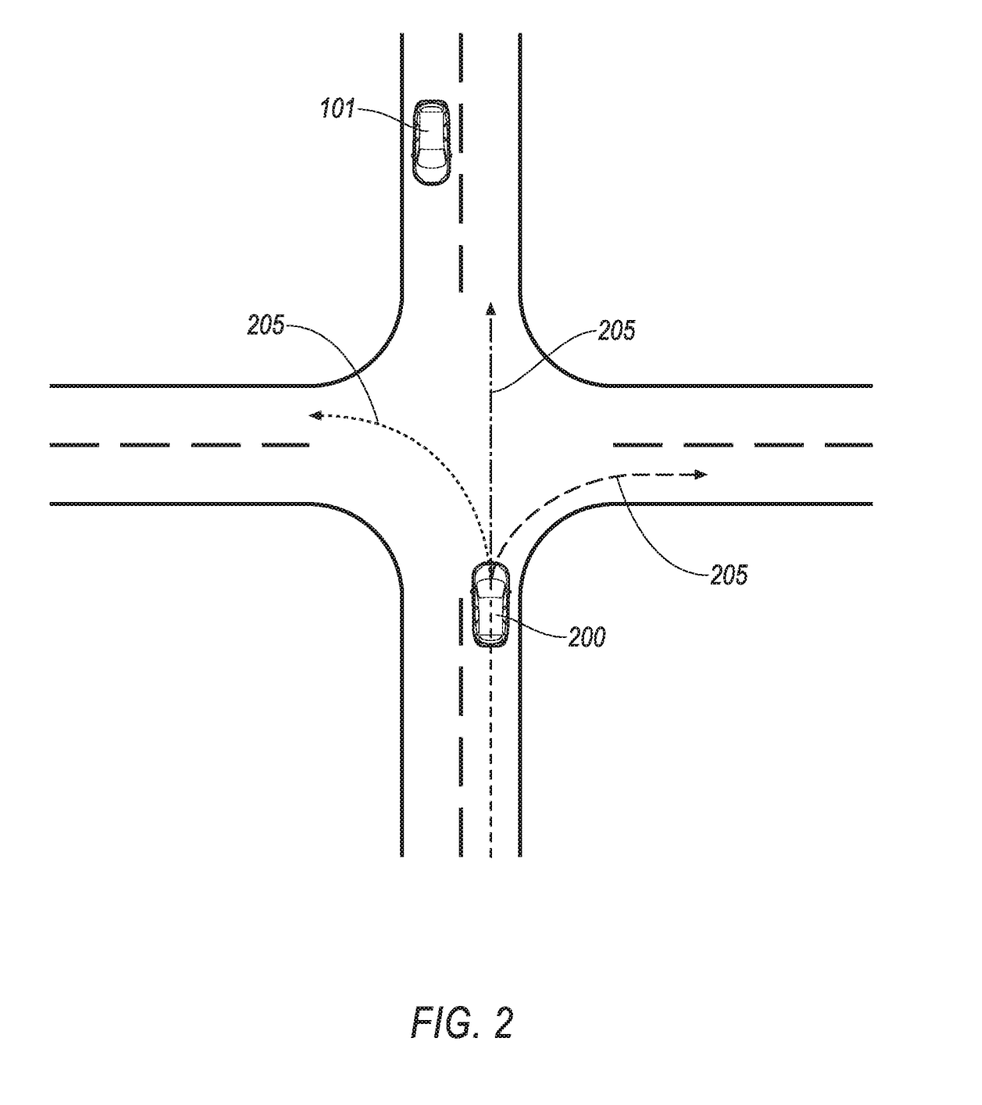
FIG. 2 is a top-down view of a roadway including a target vehicle.

FIG. 2 is a top-down view of an example roadway including a host vehicle 101 and a target vehicle 200. The target vehicle 200 performs a maneuver 205. A "maneuver" 205 is a trajectory, i.e., defined by a path and respective velocities and/or accelerations at points on the path, that the target vehicle 200 follows. Based on the maneuver 205, the computer 105 can adjust a path that the host vehicle 101 follows to avoid the target vehicle 200. The maneuver 205 can be a left turn, i.e., a turn into a roadway lane that is to the left relative to the target vehicle 200. For example, the target vehicle 200 can perform a left turn into a roadway lane perpendicular to a current roadway lane in which the target vehicle 200 is operating. The maneuver 205 can be a right turn, i.e., a turn into a roadway lane that is to the right relative to the target vehicle 200. The maneuver 205 can be a straight path, i.e., a trajectory along which the target vehicle 200 does not move into another roadway lane. The host vehicle 101 can monitor the target vehicle 200 to avoid a collision with the target vehicle 200. That is, based on the identified maneuver 205, the host vehicle 101 can avoid the target vehicle 200.

Figure 3:
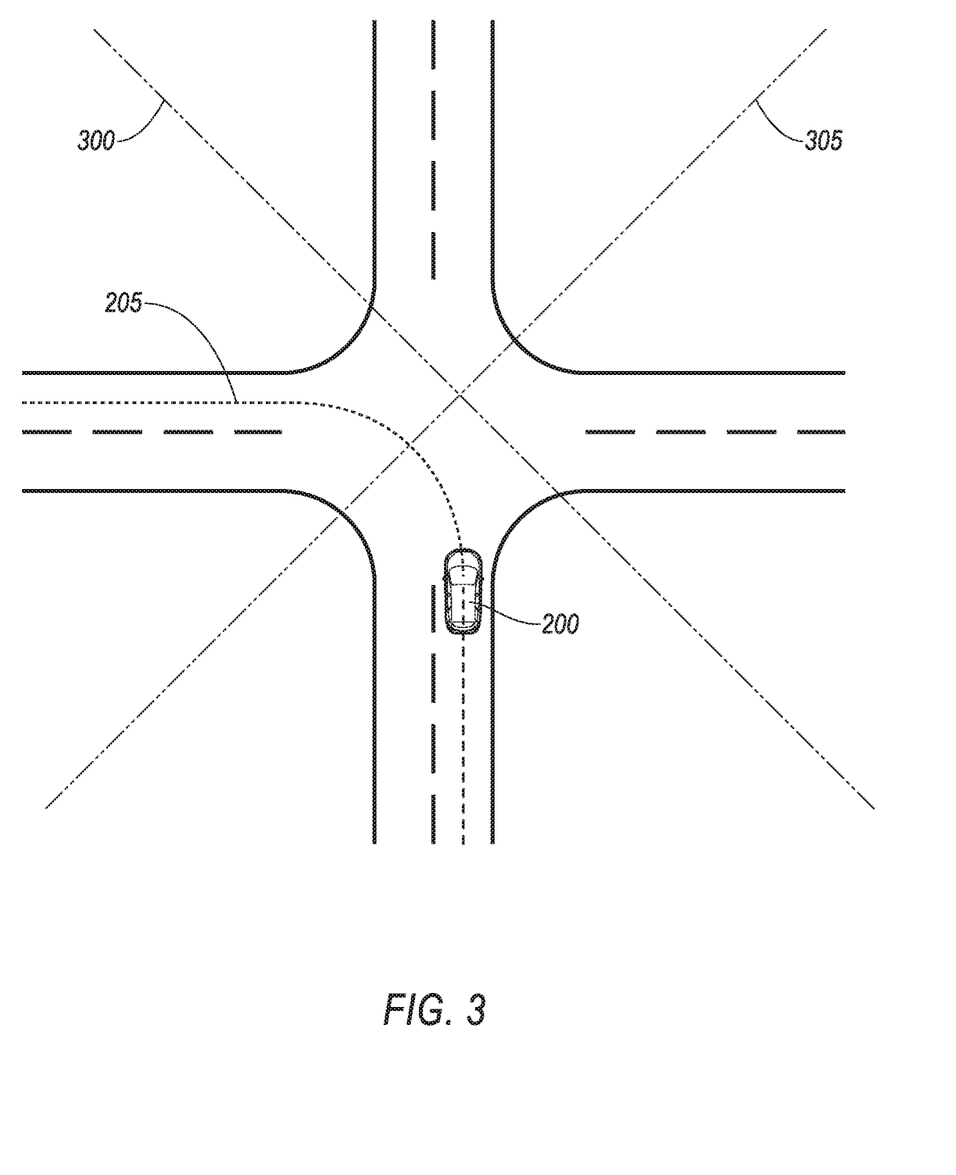
FIG. 3 is a top-down view of the target vehicle approaching a pair of virtual boundaries.

FIG. 3 is a top-down view of the roadway with the target vehicle 200. The computer 105 can generate a first virtual boundary 300 and a second virtual boundary 305. In this context, a "virtual boundary" is a set of geo-coordinates representing a virtual line on a roadway. That is, the virtual boundary is a virtual line on a map stored in the computer 105.

The computer 105 can collect data about the target vehicle 200 to generate the virtual boundaries 300, 305. The data can include a position of the target vehicle 200. A "position" of the target vehicle 200 is a set of coordinates x, y defining a point in a global coordinate system, where x is a geo-coordinate along a lateral axis defining a latitude and y is a geo-coordinate along a longitudinal axis defining a longitude. The position of the target vehicle 200 is the geo-coordinates of a specified part of the target vehicle 200, e.g., a center of a front bumper, a center of a rear axle, etc., and can be specified as $x_t$, $y_t$.

The data can include a heading angle $\beta$ of the target vehicle 200, i.e., an angle defined between an axis extending along a center line of the target vehicle 200 parallel to the longitudinal axis and the longitudinal axis of the global coordinate system. The data can include a longitudinal velocity v of the target vehicle 200, i.e., the velocity along the longitudinal axis. The data can include a wheelbase L of the target vehicle 200, i.e., a distance between a center of a front wheel and a center of a rear wheel of the target vehicle 200. The data can include a steering angle $\delta$, i.e., an angle define between an axis extending through a center of a front wheel of the target vehicle 200 and the longitudinal axis. The data can include a longitudinal acceleration $\alpha$, i.e., an acceleration along the longitudinal axis. The computer 105 can receive the steering angle $\delta$ and the longitudinal acceleration $\alpha$ from the target vehicle 200 as steering and propulsion data over the network 120, e.g., broadcast as a message.

The computer 105 can define equations $h_1$, $h_2$ to define the first virtual boundary 300 and the second virtual boundary 305 as respective lines. The equations $h_1$, $h_2$ can be defined for coordinates x, y as:

$$h_1(x,y) = y_{int}^{(1)} - y - m^{(1)}x \quad (1)$$

$$h_2(x,y) = y_{int}^{(2)} - y - m^{(2)}x \quad (2)$$

where $y_{int}^{(1)}$, $y_{int}^{(2)}$ are intercepts of the longitudinal axis and $m^{(1)}$, $m^{(2)}$ are scalar slope coefficients for the x coordinate. The equation $h_1=0$ defines the first virtual boundary 300. The equation $h_2=0$ defines the second virtual boundary 305. The computer 105 can identify a distance of the target vehicle 200 to the first and second virtual boundaries 300, 305 based on a position $x_t$, $y_t$ of the target vehicle 200 and the equations for $h_1$, $h_2$.

The computer 105 can define equations $h_1$, $h_2$ to define a first boundary approach velocity to the first virtual boundary 300 and a second boundary approach velocity to the second virtual boundary 305. The equations take a set of variables $s=[x, y, \beta, v]$ and a second set of variables $u=[\delta, a]$ as input.

$$\dot{s} = f(s) + g(s)u \quad (3)$$

$$\dot{h}_1 = L_f h_1 = \frac{\partial h_1}{\partial s} f(s) \quad (4)$$

$$\dot{h}_2 = L_f h_2 = \frac{\partial h_2}{\partial s} f(s) \quad (5)$$

where the functions describing $\dot{s}$ are defined as:

$$f(s) = \begin{bmatrix} v\cos(\beta) \\ v\sin(\beta) \\ 0 \\ 0 \end{bmatrix} \quad (6)$$

$$g(s) = \begin{bmatrix} 0 & 0 \\ 0 & 0 \\ \frac{v}{L} & 0 \\ 0 & G \end{bmatrix} \quad (7)$$

where G is the acceleration due to gravity. The equations represent a simplified bicycle model for the target vehicle 200.

For the intersection shown in FIG. 3, the equations can define the boundary approach velocities:

$$\dot{h}_1 = -v(\cos\beta + \sin\beta) \quad (8)$$

$$\dot{h}_2 = v(\cos = -\sin\beta) \quad (9)$$

The computer 105 can define equations $\ddot{h}_1$, $\ddot{h}_2$ to define a first boundary approach acceleration to the first virtual boundary 300 and a second boundary approach acceleration to the second virtual boundary 305:

$$\ddot{h}_1 L_g L_f h_1 \cdot u + L_f^2 h_1 = \frac{\partial(L_f h_1)}{\partial s} g(s) \cdot u + \frac{\partial(L_f h_1)}{\partial s} f(s) \quad (10)$$

$$\ddot{h}_2 L_g L_f h_2 \cdot u + L_f^2 h_2 = \frac{\partial(L_f h_2)}{\partial s} g(s) \cdot u + \frac{\partial(L_f h_2)}{\partial s} f(s) \quad (11)$$

and the equations can define the boundary approach accelerations:

$$\ddot{h}_1 = \frac{v^2(\sin\beta - \cos\beta)}{L}\delta - Gv(\cos\beta + \sin\beta)u \quad (12)$$

$$\ddot{h}_2 = \frac{v^2(\sin\beta + \cos\beta)}{L}\delta + Gv(\cos\beta - \sin\beta)u \quad (13)$$

The computer 105 can identify a plurality of constraint values c. A "constraint value" c is a value based on one of the virtual boundaries 300, 305, the boundary approach velocity, and the boundary approach acceleration that indicates motion of the target vehicle 200 to the virtual boundary 300, 305. The computer 105 can compare the constraint value c to a predetermined threshold, as described below, to identify a maneuver of the target 200. The computer 105 can define equations to determine two constraint values $c_1$, $c_2$ based on the virtual boundary equations:

$$c_1(s) = \ddot{h}_1(s) + L_1^{(1)}\dot{h}_1(s) + L_0^{(1)}h_1(s) \quad (14)$$

$$c_2(s) = \ddot{h}_2(s) + L_1^{(2)}\dot{h}_2(s) + L_0^{(2)}h_2(s) \quad (15)$$

where $L_0^{(1)}$, $L_0^{(2)}$, $L_1^{(1)}$, $L_1^{(2)}$ are predetermined scalar values specific to the geometry of the intersection, as described below. Thus, the first constraint value $c_1$ is based on the first boundary approach velocity $\dot{h}_1$ of the target vehicle 200 and a first boundary approach acceleration $\ddot{h}_1$ of the target vehicle 200. The second constraint value $c_2$ is based on the second boundary approach velocity $\dot{h}_1$ of the target vehicle 200 and a second boundary approach acceleration $\ddot{h}_2$ of the target vehicle 200. Alternatively, when acceleration data of the target vehicle 200 is unavailable, the first and second constraint values $c_1$, $c_2$ can be determined based on the boundary approach speeds $\dot{h}_1$, $\dot{h}_2$:

$$c_1(s) = \dot{h}_1(s) + L_0^{(1)}h_1(s) \quad (16)$$

$$c_2(s) = \dot{h}_2(s) + L_0^{(2)}h_2(s) \quad (17)$$

The computer 105 can identify a maneuver 205 based on whether one or more constraint values c violate a threshold. In this context, a threshold is "violated" if the constraint value c is outside a range of values limited or defined by the threshold. For example, the threshold can be violated when the constraint value c exceeds the threshold. Alternatively, the threshold can be violated when the constraint value c falls below the threshold. In the example of FIGS. 2-3, the computer 105 can identify maneuvers 205 based on a comparison of at least three constraint values c to respective thresholds:

TABLE 1

Identifying Maneuvers

| Maneuver | $c_1 > 0$ | $c_2 > 0$ | $c_3 = h_1(s) > 0$ | $c_4 = h_2(s) > 0$ |
| --- | --- | --- | --- | --- |
| Left Turn | True | False | True | True |
| Left Turn | True | False | True | False |
| Right Turn | False | True | True | True |
| Right Turn | False | True | False | True |
| Straight Path | True | True | True | True |
| Straight Path | False | False | True | True |
| Straight Path | False | False | False | False |

In the example of Table 1, the respective thresholds are 0, and the constraint values $c_1$, $c_2$, $c_3$, $c_4$ violate the thresholds upon falling below 0. That is, based on the sign of the constraint values $c_1$, $c_2$, $c_3$, $c_4$, the "sign" being positive or negative, the computer 105 can identify the maneuver 205. For example, the computer 105 can identify the maneuver 205 as a left turn when the sign of the second constraint value $c_2$ is negative and the sign of the first constraint value $c_1$ is positive. In another example, the computer 105 can identify the maneuver 205 as a right turn when the sign of the first constraint value $c_1$ is negative. In yet another example, the computer 105 can identify the maneuver 205 as a right turn when the sign of the third constraint value $c_3$ is negative. That is, when the third constraint value $c_3$ is negative, the target vehicle 200 has crossed the first virtual boundary 300. When the fourth constraint value $c_4$ is negative, the target vehicle has crossed the second virtual boundary 305.

Upon identifying the maneuver 205, the computer 105 can adjust a path of a host vehicle 101 to avoid the target vehicle 200. The computer 105 can input the identified maneuver 205 of the target vehicle 200 into a path planning algorithm for the host vehicle 101 to generate an adjusted path that avoids the target vehicle 200. The computer 105 can actuate one or more of a propulsion, a steering, or a brake of the host vehicle 101 to follow the adjusted path to avoid the target vehicle 200. The path polynomial p(y) is a model that predicts the path as a line traced by a polynomial equation. The path polynomial p(y) predicts the path for a predetermined upcoming distance y, by determining a longitudinal coordinate y, e.g., measured in meters:

$$p(y) = a_0 + a_1 y + a_2 y^2 + a_3 y^3 \quad (18)$$

where $a_0$ an offset, i.e., a lateral distance between the path and a center line of the host vehicle 101 at the upcoming distance y, $a_1$ is a heading angle of the path, $a_2$ is the curvature of the path, and $a_3$ is the curvature rate of the path. In the present context, the "upcoming distance" y is a predetermined longitudinal distance in front of the host vehicle 101 from a front bumper of the host vehicle 101 at which the sensors 110 collect data and the path planner predicts the path. The upcoming distance y can be determined based on, e.g., a current speed of the host vehicle 101, a predetermined time threshold, determined based on empirical simulation data, a detection range of the sensors 110, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the host vehicle path polynomial, where braking torque and powertrain torque are applied as positive and negative longitudinal accelerations and clockwise and counter clockwise steering torque are applied as left and right lateral accelerations.

The server 125 can determine the coefficients of the equations describing the virtual boundaries, the virtual boundary velocities, the virtual boundary accelerations, and the constraint values by minimizing a cost function. The server 125 can determine the coefficients of the equations and transmit the coefficients to the computer 105 of the vehicle 101. The server 125 can input a plurality of reference trajectories into the equations defining the first and second virtual boundaries 300, 305 and the constraint values c to determine the coefficients of the equations. A "reference trajectory" is a set of data describing a path of a target vehicle 200 in an intersection performing a specified maneuver 205, e.g., from a virtual simulation model, empirical testing, etc. The reference trajectory includes time-stamped data of the target vehicle 200 position, velocity, and acceleration. The reference trajectory includes an identification of the maneuver 205 performed by the target vehicle 200 and a specified initiation time $\bar{t}$ at which the maneuver 205 starts, e.g., a time at which a steering wheel of the target vehicle 200 begins to turn. The server 125 can input the data from the reference trajectory into the equations listed above with reference coefficients to predict an initiation time t of the maneuver 205, i.e., a time at which one or more constraint values c violate their respective thresholds. The "reference coefficients" are initial values for the coefficients of the virtual boundary equations that are optimized according to the cost function. The initiation time t is the time at which the server 125 identifies the maneuver 205.

The server 125 can determine a time difference $t-\bar{t}$ between the predicted initiation time t and the specified initiation time E. The server 125 can input the time differences $t-\bar{t}$ for the plurality of reference trajectories into a cost function to determine the coefficients:

$$\min_{\theta} \sum_{i=1}^{N} \begin{cases} t(\theta, i) - \bar{t}(i) & \text{Left or Right Turn} \\ P & \text{Straight Path} \end{cases} \quad (19)$$

$$\theta = [\, y_{int}^{(1)} \quad m^{(1)} \quad L_0^{(1)} \quad L_1^{(1)} \quad y_{int}^{(2)} \quad m^{(2)} \quad L_0^{(2)} \quad L_1^{(2)} \,] \quad (20)$$

where θ is the set of coefficients to be determined by the cost function, N is the total number of reference trajectories, i is a natural number between 1 and N, and P is a predetermined value that causes the equations to output an indication of a straight path maneuver 205. That is, P prevents the equations from classifying turns as straight paths. The server 125 can adjust the coefficients θ to minimize the time differences t−E $\bar{t}$ for each of the plurality of reference trajectories. Upon minimizing the sum of the time differences $t-\bar{t}$, the server 125 can identify the coefficients θ associated with the minimized sum and assign the coefficients θ to replace the current coefficients of the equations.

The server 125 can adjust the coefficients according to a gradient free genetic algorithm. A "genetic" algorithm is an algorithm that generates a population of candidate solutions and alters the population to generate new candidate solutions until an optimization threshold is met. A "gradient free" algorithm is an optimization algorithm that uses other techniques than derivative information to perform the optimization, e.g, Bayesian techniques, coordinate descent, genetic algorithms, simulated annealing, etc.

To determine the coefficients θ, the server 125 can generate an initial population including a plurality of sets of coefficients θ using, e.g., a random number generator, a simulation model, etc. The server 125 can identify a value of the cost function described above for each set of coefficients θ, each value being a "raw fitness" value. The serve 125 can scale the raw fitness values according to a conventional scaling factor (e.g., normalizing the values between 0 and 1) to generate a plurality of "expectation" values. The server 125 can generate a second population based on the expectation values. The second population can include a specified amount of the lowest expectation values, e.g., 10%, 20%, etc. That is, the lowest expectation values correspond to coefficients θ having lowest cost function values and more closely aligned with the reference trajectories. The server 125 can identify "parent" expectation values, i.e., expectation values that are combined and/or adjusted to generate "child" expectation values. For example, a parent expectation value can have random values adjusted, i.e., "mutated," to generate a child expectation value. In another example, two parent expectation values can be combined to generate the child expectation value. The parent expectation values can be a specified amount of the lowest expectation values after removing the lowest expectation values described above. The second population can include the child expectation values and the previously identified lowest expectation values. Generating the second population from the previously identified population is a "generation." The server 125 can produce generations of sets of coefficients θ until a condition is met. For example, the condition can be a predetermined number of generations produced, e.g., 200, 500, 1000, etc. In another example, the condition can be a determination that a lowest raw fitness value has not decreased in a specified number of generations, e.g., 25, 50, 100, etc. The gradient free genetic algorithm reduces the likelihood of the optimization reaching a local minimum instead of a global minimum, improving the likelihood that the set of coefficients θ most closely maps to the reference trajectories.

Figure 4:
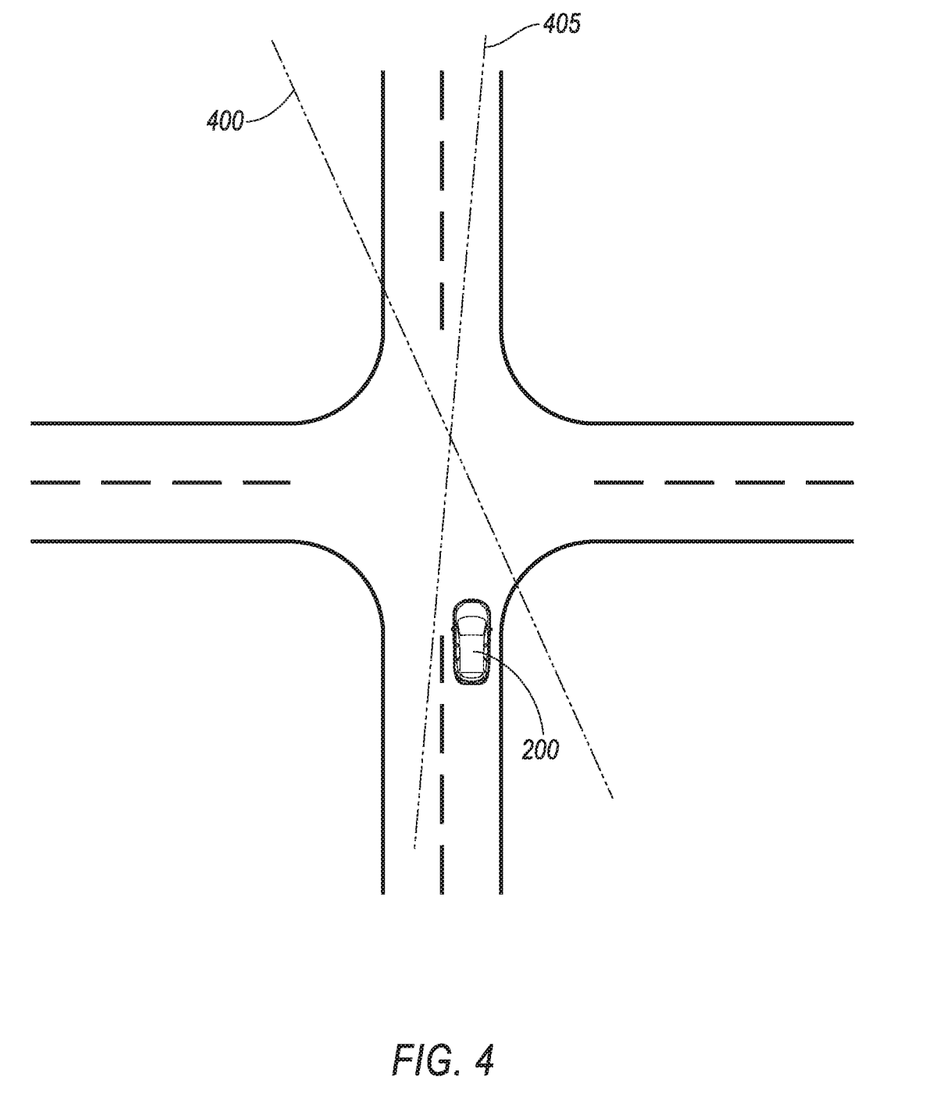
FIG. 4 is a top-down view of the target vehicle approaching another pair of virtual boundaries.

FIG. 4 illustrates an example intersection with a first virtual boundary 400 and a second virtual boundary 405 determined by the server 125 minimizing the cost function described above and transmitting the equations to the computer 105. While the first and second virtual boundaries 300, 305 of the example of FIGS. 2-3 are substantially orthogonal for illustration purposes, the first virtual boundary 400 and the second virtual boundary 405 can be narrower than the virtual boundaries 300, 305 in the longitudinal direction. That is, based on the coefficients θ identified by the cost function described above, the equations defining the first and second virtual boundaries 400, 405 can differ for different intersections based on, e.g., a number of roadway lanes, respective directions of the roadway lanes, etc. For example, the intersection of FIGS. 2-4 show two roadway lanes intersecting two other roadway lanes, resulting in the first and second virtual boundaries 400, 405 from the coefficients θ. In another example, if the intersection has a different number of roadway lanes, e.g., three roadway lanes intersecting three other roadway lanes, the cost function can output different coefficients θ resulting in different orientations of the virtual boundaries 400, 405. The constraint values c thus can differ for the intersection of FIG. 4 than the intersection of FIGS. 2-3. For example, because the second virtual boundary 405 extends into an adjacent roadway lane of the target vehicle 200, the threshold associated with the second boundary approach velocity $h_2$ and the second boundary approach acceleration $h_2$ is likely violated at an earlier time than the respective threshold associated with the second virtual boundary 305. Thus, the computer 105 can identify the maneuver at an earlier time when the target vehicle 200 approaches the virtual boundaries 400, 405.

Figure 5:
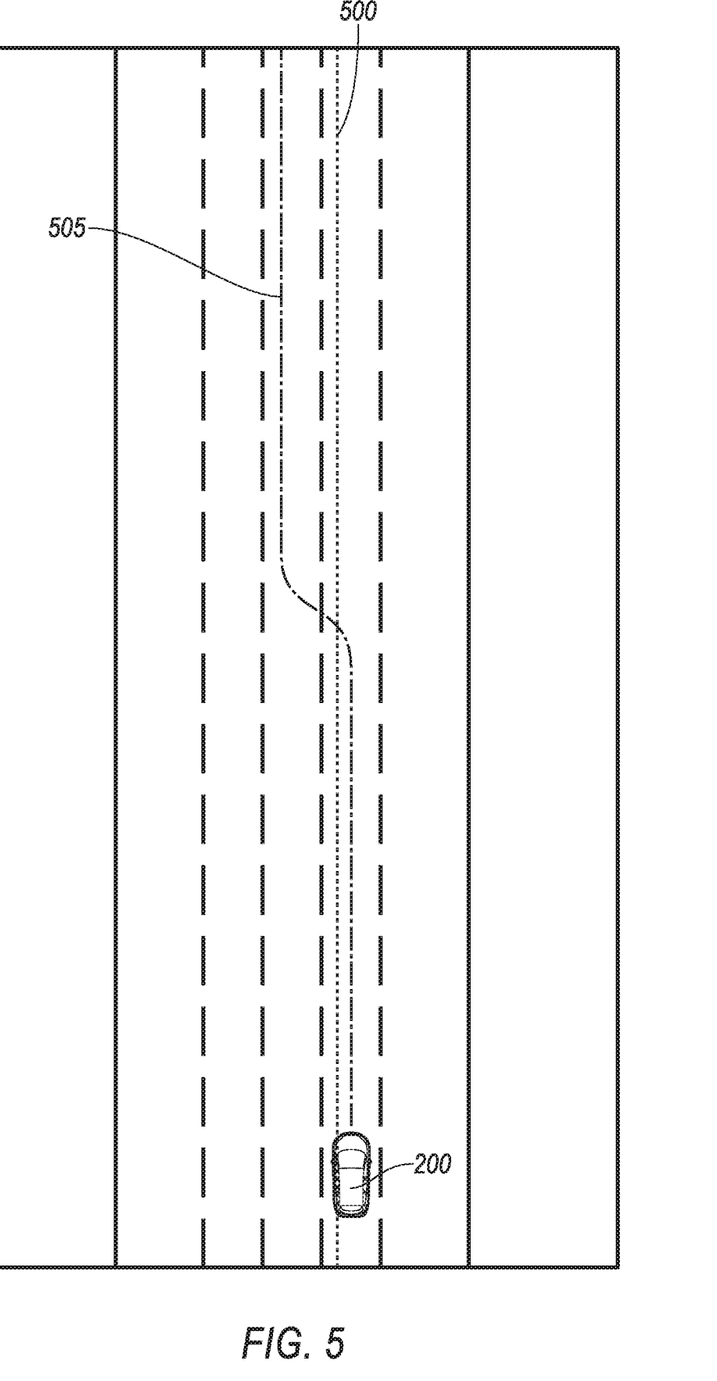
FIG. 5 is a top-down view of a plurality of the target vehicle approaching another pair of virtual boundaries.

FIG. 5 is a top-down view of an example roadway including a virtual boundary 500. In addition to identifying maneuvers at an intersection, the computer 105 can identify a maneuver 505 of the target vehicle 200 including a lane change. That is, the computer 105 can associate a left turn with a lane change to an adjacent lane to the left of the target vehicle 200, a right turn with a lane change to an adjacent lane to the right of the target vehicle, and a straight path as the target vehicle 200 not changing lanes. The computer 105 can identify respective coefficients θ for the virtual boundary equations for $h_1$, $h_2$, $h_1$, $h_2$, $h_1$, $h_2$ with a cost function such as the cost function described above. The computer 105 can identify constraint values c, as described above, and can identify the maneuver 505 when one or more of the thresholds are violated. For example, as shown in FIG. 5, the maneuver 505 is a lane change, i.e., a movement from a current roadway lane to an adjacent roadway lane.

Figure 6:
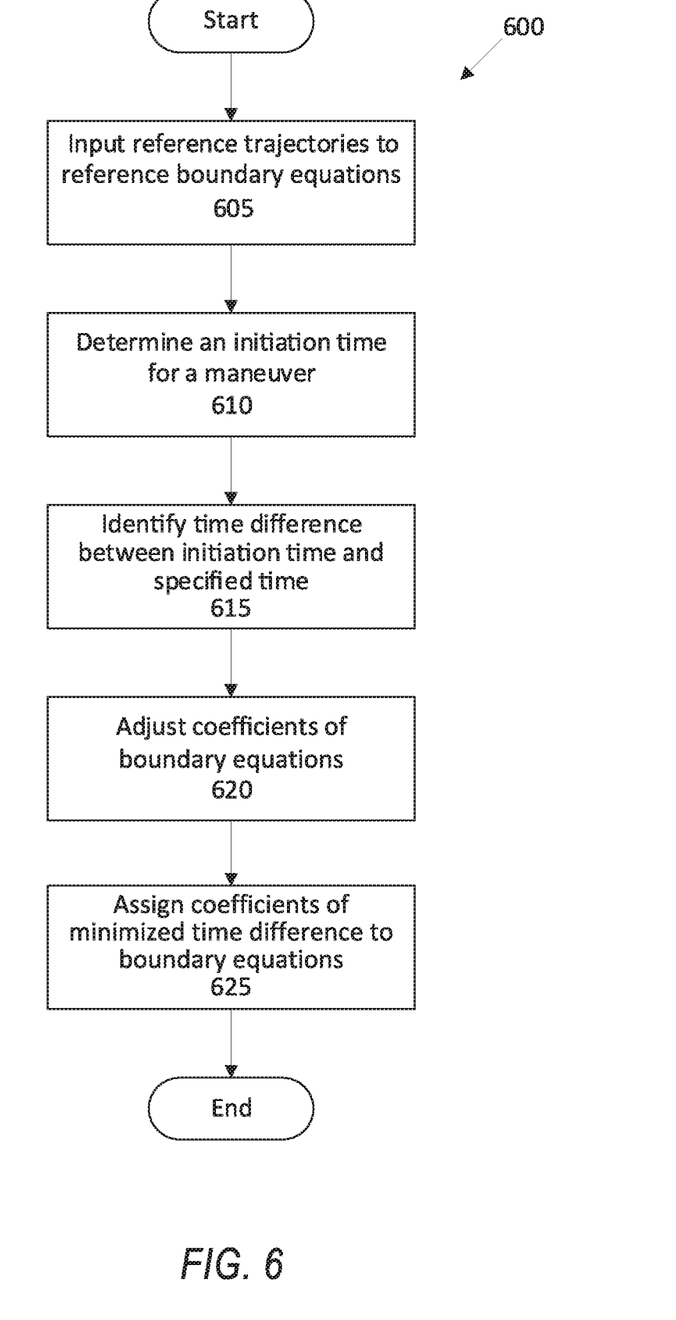
FIG. 6 is a block diagram of an example process for identifying virtual boundaries.

FIG. 6 is an example process 600 for determining virtual boundary equations for a roadway. The process 600 begins in a block 605, in which the server 125 inputs a plurality of reference trajectories into virtual boundary equations with reference coefficients. As described above, the reference coefficients are initial values for the coefficients of the virtual boundary equations that are optimized according to a cost function. The reference trajectories are data describing a specified maneuver 205, 505 of a target vehicle 200 and an identification of the maneuver 205, 505 performed. The reference trajectories can be determined by simulation models and stored in a database.

Next, in a block 610, the server 125 determines an initiation time t for the maneuver 205, 505 for each reference trajectory. The server 125 can define constraint values c for one of the reference trajectories based on the virtual boundary equations. The server 125 can identify a time at which at least one of the constraint values c violates a threshold as the initiation time t for the maneuver 205, 505.

Next, in a block 615, the server 125 identifies a time difference $t-\bar{t}$ between the initiation time t and a specified initiation time $\bar{t}$ of the maneuver 205, 505 for each reference trajectory. The reference trajectory includes the specified initiation time $\bar{t}$ that the target vehicle 200 initiates the maneuver 205, 505, e.g., the time $\bar{t}$ at which a steering wheel of the target vehicle 200 turns.

Next, in a block 620, the server 125 adjusts coefficients of the virtual boundary equations to generate a plurality of time differences $t-\bar{t}$ according to a conventional cost function to minimize the time difference $t-\bar{t}$. The cost function, as described above, can minimize a sum of time differences $t-\bar{t}$ of the reference trajectories to identify maneuvers 205 that are turns and compare the initiation time t to a predetermined false positive value P to identify straight path maneuvers 205. The server 125 can adjust the coefficients to generate new virtual boundary equations, from which the server 125 can identify a plurality of sums of time differences $t-\bar{t}$ of the reference equations.

Next, in a block 625, the server 125 assigns coefficients associated with the minimized sum of time differences $t-\bar{t}$ to the virtual boundary equations. The coefficients of the virtual boundary equations associated with the minimized sum represent the closest prediction of initiation of the maneuver 205, 505 to the specified initiation of the maneuver 205, 505 in the reference trajectory. That is, the virtual boundary equations associated with the minimized sum most closely predict the initiation of the maneuver 205, 505 of the target vehicle 200. Following the block 625, the process 600 ends.

Figure 7:
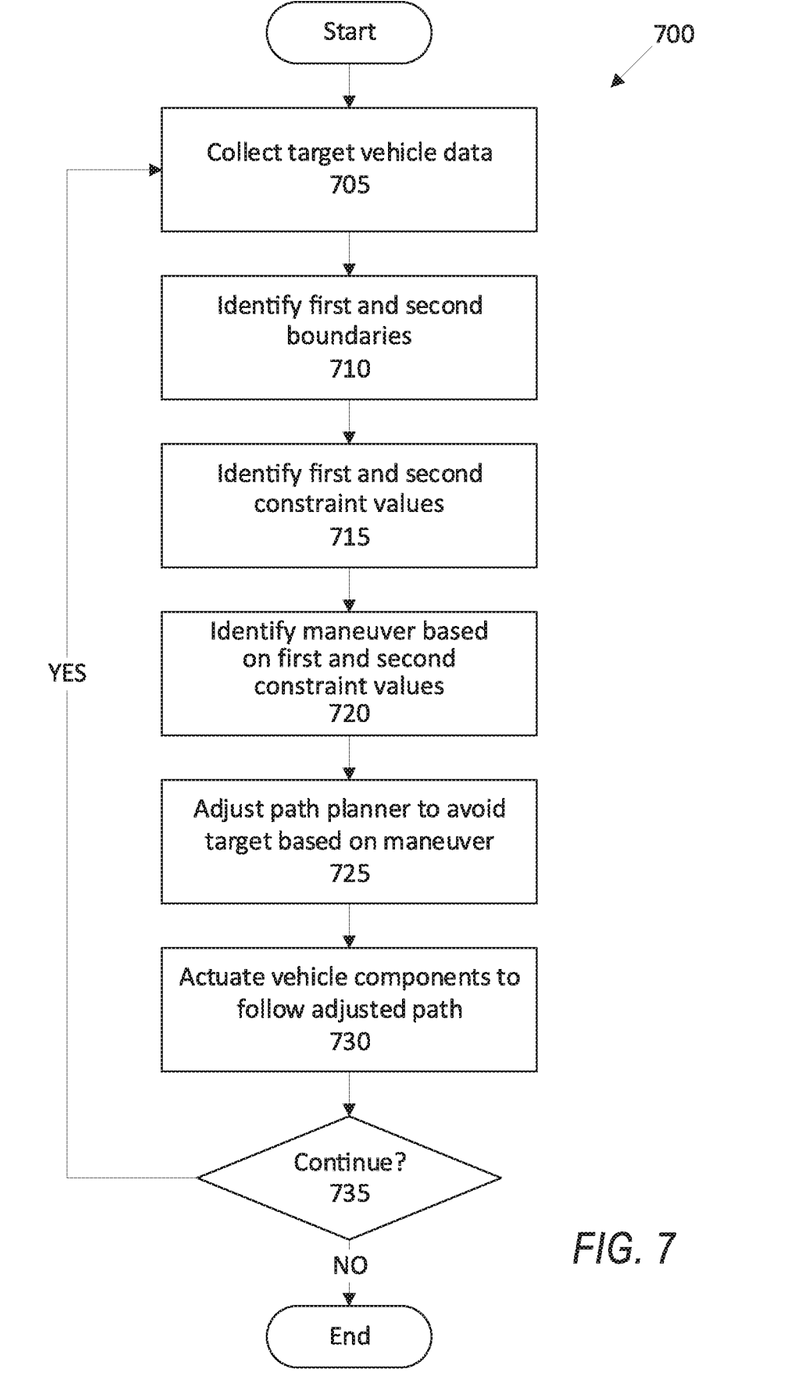
FIG. 7 is a block diagram of an example process for identifying a maneuver performed by the target vehicle.

FIG. 7 is a block diagram of an example process 700 for identifying a maneuver 205 of a target vehicle 200. The process 700 begins in a block 705, in which a computer 105 of a host vehicle 101 collects data about the target vehicle 200. The computer 105 can actuate one or more sensors 110 to collect the data. The data can include steering and/or propulsion (e.g., throttle) data received from the target vehicle 200 over a network 120.

Next, in a block 710, the computer 105 identifies a first virtual boundary 300, 400 500 and a second virtual boundary 305, 405. As described above, the computer 105 can identify the virtual boundaries 300, 305, 400, 405, 500 according to virtual boundary equations, such as the virtual boundary equations identified by the process 600. The virtual boundaries 300, 305, 400, 405, 500 are sets of geo-coordinates representing virtual lines on a roadway.

Next, in a block 715, the computer 105 identifies first and second constraint values $c_1$, $c_2$. As described above, the constraint values $c_1$, $c_2$ are values based on one of the virtual boundaries 300, 305, 400, 405, 500, a boundary approach velocity, and a boundary approach acceleration that indicates motion of the target vehicle 200 to the virtual boundary 300, 305, 400, 405, 500. For example, a constraint value can be an output of one of the virtual boundary equations described above.

Next, in a block 720, the computer 105 identifies the maneuver 205 based on the first and second constraint values $c_1$, $c_2$. That is, the computer 105 identifies the maneuver 205 when one of the constraint values $c_1$, $c_2$ and/or the position of the target vehicle 200 violates a respective threshold, e.g., according to the Boolean values in Table 1 above. For example, the computer 105 can identify the maneuver 205 as a left turn when the second constraint value $c_2$ violates a threshold.

Next, in a block 725, the computer 105 inputs the identified maneuver 205 to a path planning algorithm to adjust a planned path of the host vehicle 101. As described above, the path planning algorithm can be a path polynomial that generates a path along which the computer 105 actuates one or more components 115 to follow the path. The computer 105 can adjust the path based on the identified maneuver 205. For example, the path planning algorithm can adjust the path to avoid the target vehicle 200 until the target vehicle 200 completes a left turn.

Next, in a block 730, the computer 105 actuates one or more components 115 to follow the adjusted path. For example, the computer 105 can actuate a brake to slow the host vehicle 101 along the path. In another example, the computer 105 can actuate a steering to steer the host vehicle 101 along the path.

Next, in a block 735, the computer 105 determines whether to continue the process 700. For example, the computer 105 can determine to continue upon identifying another target vehicle 200. If the computer 105 determines to continue, the process 700 returns to the block 705. Otherwise, the process 700 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first," "second," and "third" are used throughout this document as identifiers and are not intended to signify importance or order.

What is claimed is:

1. A system, comprising a computer including a processor and a memory, the memory storing instructions executable by the processor to:
   identify a target vehicle to be monitored;
   identify first and second virtual boundaries on a roadway based on a position of the target vehicle;
   determine a first constraint value based on (1) a first boundary approach velocity of the target vehicle including a heading angle of the target vehicle and (2) a first boundary approach acceleration of the target vehicle including a steering angle of the target vehicle;
   determine a second constraint value based on (1) a second boundary approach velocity of the target vehicle including the heading angle of the target vehicle and (2) a second boundary approach acceleration of the target vehicle including the steering angle of the target vehicle;
   identify a maneuver of the target vehicle based on whether the first constraint value violates a first threshold, the second constraint value violates a second threshold, or a position of the target vehicle relative to the first and second virtual boundaries violates a third threshold; and adjust a path of a host vehicle to avoid the target vehicle according to the identified maneuver.

2. The system of claim 1, wherein the instructions further include instructions to identify the maneuver as a left turn when the first constraint value does not violate the first threshold, the second constraint value violates the second threshold, and the position of the target vehicle relative to the first virtual boundary does not violate the third threshold.

3. The system of claim 1, wherein the instructions further include instructions to identify the maneuver as a right turn when the first constraint value violates the first threshold, the second constraint value does not violate the second threshold, and the position of the target vehicle relative to the second virtual boundary does not violate the third threshold.

4. The system of claim 1, wherein the instructions further include instructions to input the identified maneuver into a path planning algorithm to generate an adjusted path to avoid the target vehicle.

5. The system of claim 4, wherein the instructions further include instructions to actuate one or more of a propulsion, a steering, or a brake of the host vehicle to follow the adjusted path to avoid the target vehicle.

6. The system of claim 1, wherein the instructions further include instructions to determine that the first value violates the first threshold based on a sign of the first value.

7. The system of claim 1, wherein the instructions further include instructions to determine that the position of the target vehicle violates the third threshold when the target vehicle crosses one of the first virtual boundary or the second virtual boundary.

8. The system of claim 1, wherein the instructions further include instructions to input a plurality of reference trajectories into respective equations defining the first and second virtual boundaries and the first and second constraint values, the equations including a plurality of reference coefficients, to minimize a cost function to generate a plurality of coefficients for the equations.

9. The system of claim 8, wherein the instructions further include instructions to predict an initiation time for a specified maneuver of one of the reference trajectories and to determine a time difference between the predicted initiation time and a specified initiation time for the specified maneuver.

10. The system of claim 9, wherein the instructions further include instructions to adjust the plurality of coefficients to minimize respective time differences for each of the plurality of reference trajectories.

11. The system of claim 10, wherein the instructions further include instructions to, upon minimizing a sum of the time differences, identify the plurality of coefficients associated with the minimized sum and assign the plurality of coefficients to replace the reference coefficients of the equations.

12. The system of claim 8, wherein the plurality of coefficients include a coefficient for the first boundary approach velocity and a second coefficient for the second boundary approach velocity.

13. A method, comprising:
identifying a target vehicle to be monitored;
identifying first and second virtual boundaries on a roadway based on a position of the target vehicle;
determining a first constraint value based on (1) a first boundary approach velocity of the target vehicle including a heading angle of the target vehicle and (2) a first boundary approach acceleration of the target vehicle including a steering angle of the target vehicle;
determining a second constraint value based on (1) a second boundary approach velocity of the target vehicle including the heading angle of the target vehicle and (2) a second boundary approach acceleration of the target vehicle including the steering angle of the target vehicle;
identifying a maneuver of the target vehicle based on whether the first constraint value violates a first threshold, the second constraint value violates a second threshold, or a position of the target vehicle relative to the first and second virtual boundaries violates a third threshold; and
adjusting a path of a host vehicle to avoid the target vehicle according to the identified maneuver.

14. The method of claim 13, further comprising identifying the maneuver as a left turn when the first constraint value does not violate the first threshold, the second constraint value violates the second threshold, and the position of the target vehicle relative to the first virtual boundary does not violate the third threshold.

15. The method of claim 13, further comprising identifying the maneuver as a right turn when the first constraint value violates the first threshold, the second constraint value does not violate the second threshold, and the position of the target vehicle relative to the second virtual boundary does not violate the third threshold.

16. The method of claim 13, further comprising inputting the identified maneuver into a path planning algorithm to generate an adjusted path to avoid the target vehicle.

17. A system, comprising:
a host vehicle including a propulsion, a brake, and a steering;
a target vehicle;
means for identifying first and second virtual boundaries on a roadway based on a position of the target vehicle;
means for determining a first constraint value based on (1) a first boundary approach velocity of the target vehicle including a heading angle of the target vehicle and (2) a first boundary approach acceleration of the target vehicle including a steering angle of the target vehicle;
means for determining a second constraint value based on (1) a second boundary approach velocity of the target vehicle including the heading angle of the target vehicle and (2) a second boundary approach acceleration of the target vehicle including the steering angle of the target vehicle;
means for identifying a maneuver of the target vehicle based on whether the first constraint value violates a first threshold, the second constraint value violates a second threshold, or a position of the target vehicle relative to the first and second virtual boundaries violates a third threshold; and
means for actuating at least one of the propulsion, the brake, or the steering of the host vehicle to avoid the target vehicle according to the identified maneuver.

18. The system of claim 17, further comprising means for identifying the maneuver as a left turn when the first constraint value does not violate the first threshold, the second constraint value violates the second threshold, and the position of the target vehicle relative to the first virtual boundary does not violate the third threshold.

19. The system of claim 17, further comprising means for identifying the maneuver as a right turn when the first constraint value violates the first threshold, the second constraint value does not violate the second threshold, and the position of the target vehicle relative to the second virtual boundary does not violate the third threshold.

20. The system of claim 17, further comprising means for inputting the identified maneuver into a path planning algorithm to generate an adjusted path to avoid the target vehicle.

* * * * *